Aug. 29, 1944.  A. MONACO  2,356,872
KNIFE
Filed Dec. 26, 1942  5 Sheets-Sheet 1

INVENTOR.
ANTONIO MONACO
BY
ATTORNEY

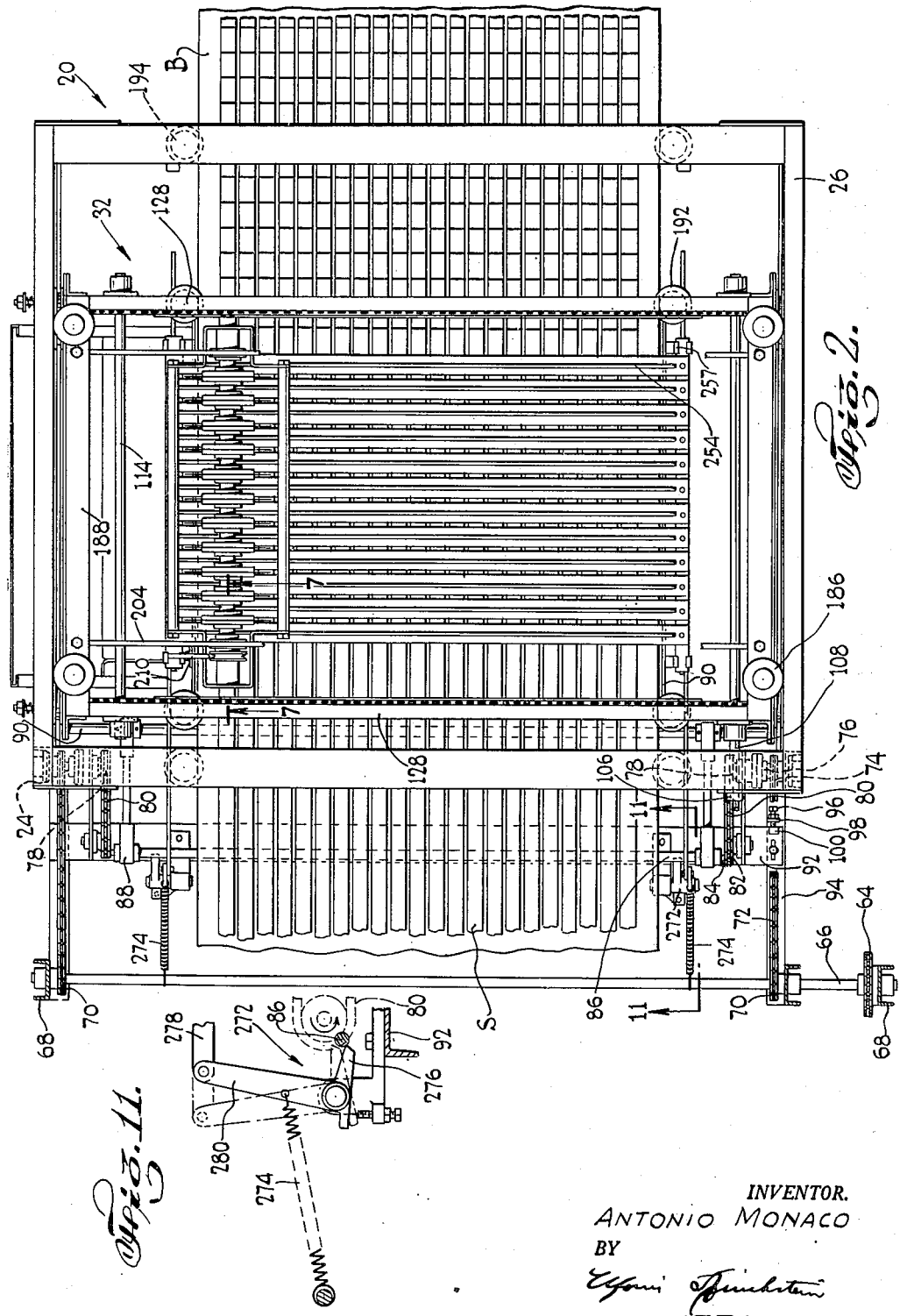

Aug. 29, 1944.　　　A. MONACO　　　2,356,872
KNIFE
Filed Dec. 26, 1942　　　5 Sheets-Sheet 3
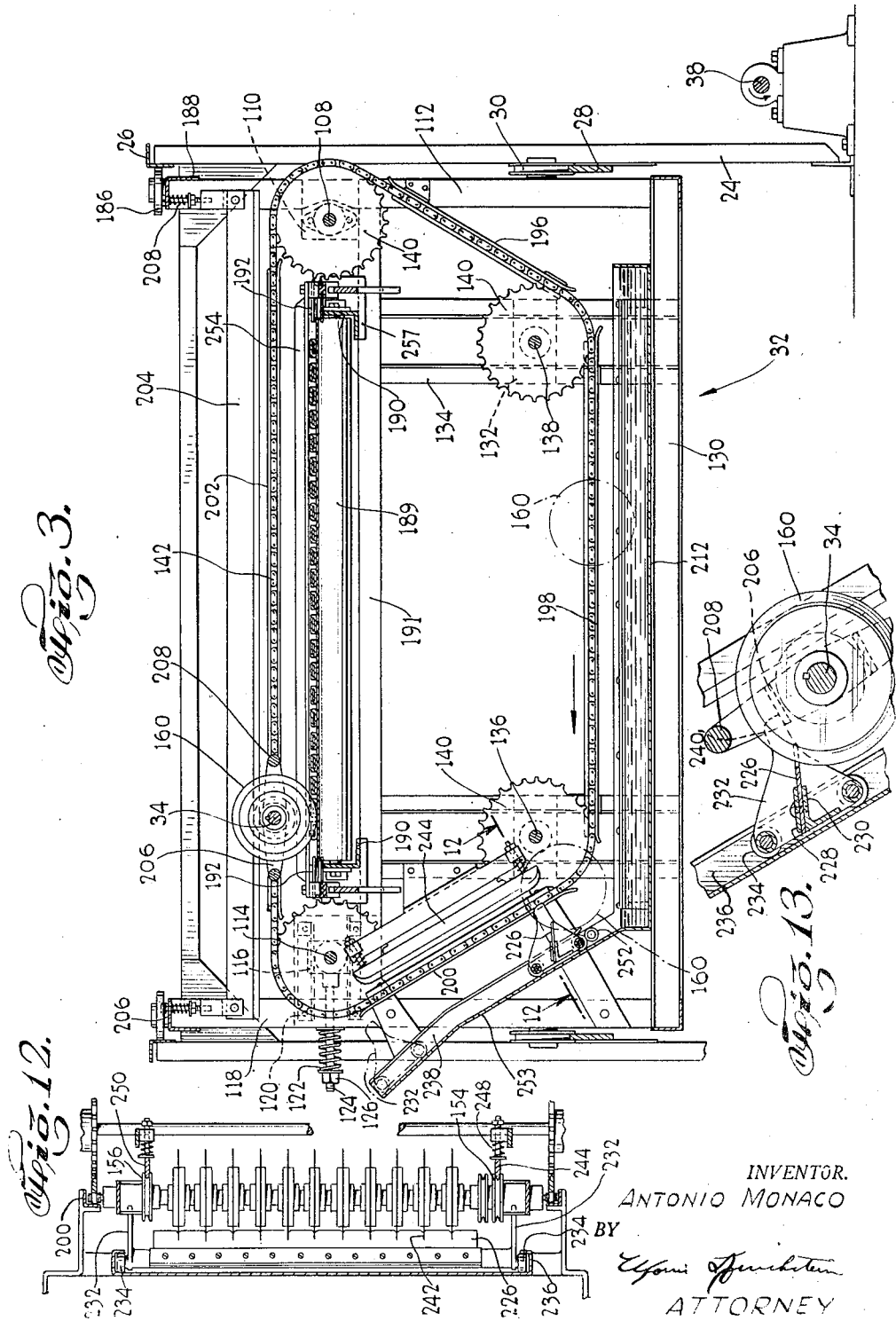
INVENTOR.
ANTONIO MONACO
BY
ATTORNEY

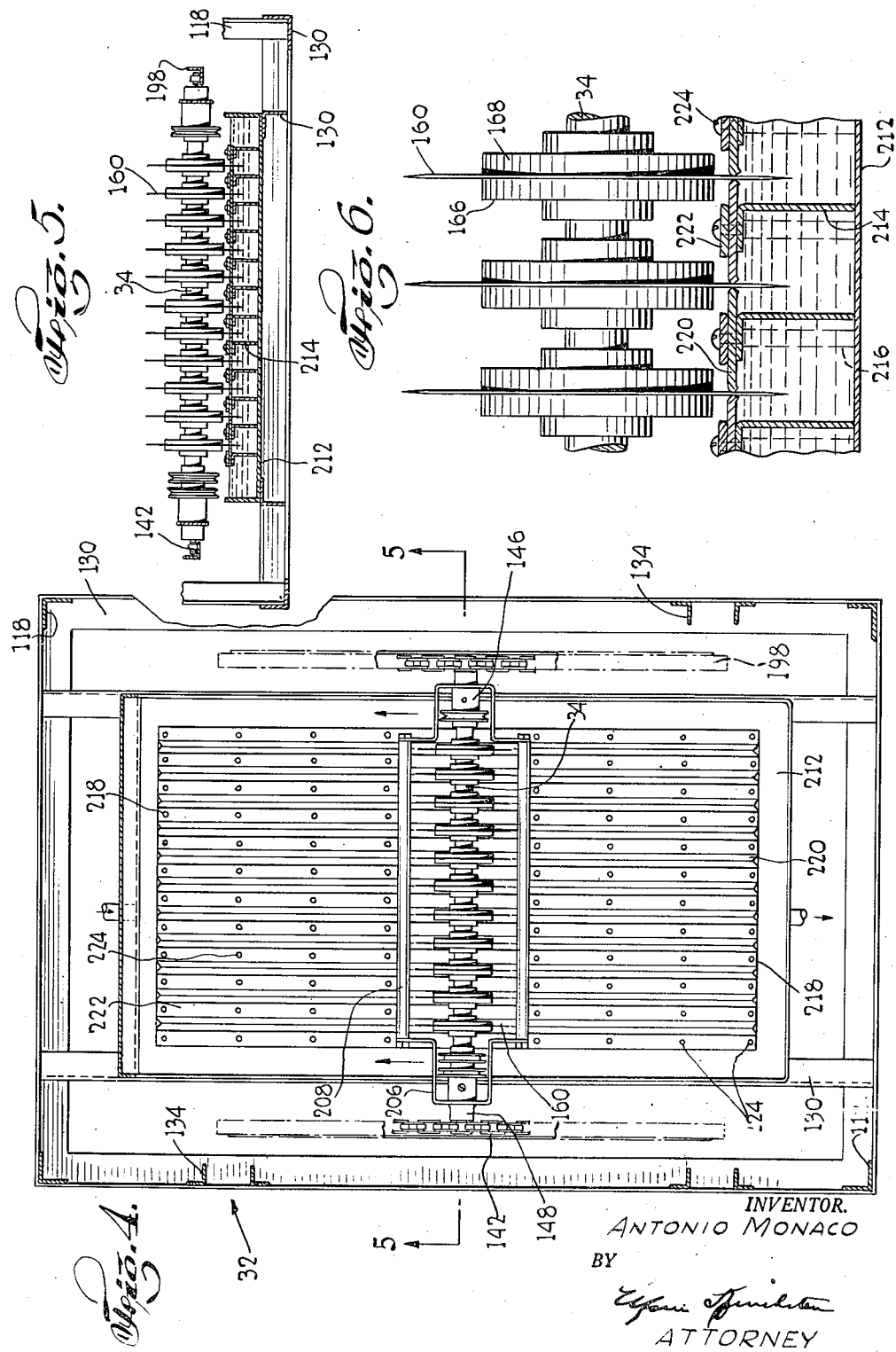

Aug. 29, 1944. A. MONACO 2,356,872
KNIFE
Filed Dec. 26, 1942 5 Sheets-Sheet 5
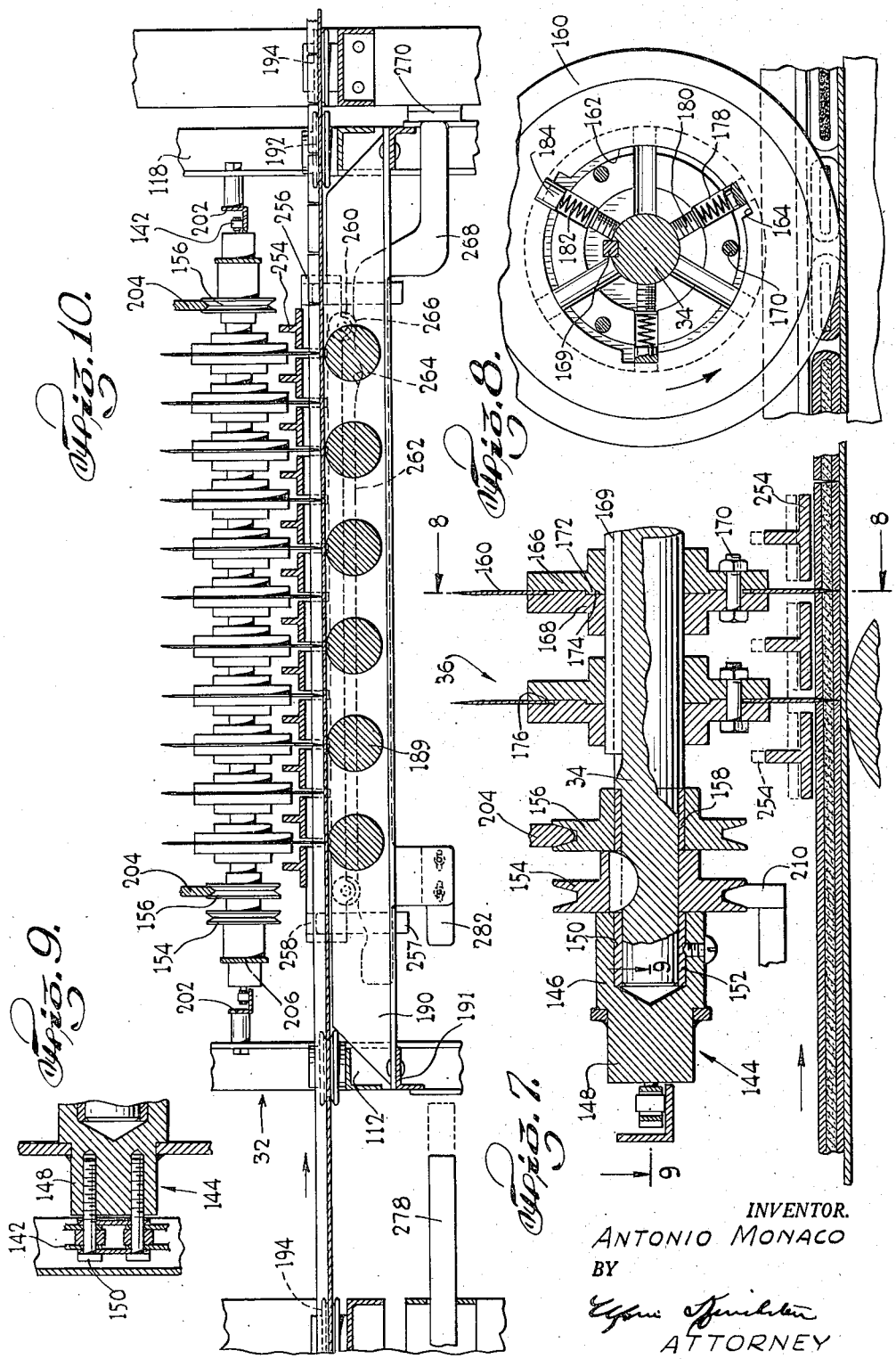
INVENTOR.
ANTONIO MONACO
BY
ATTORNEY Patented Aug. 29, 1944

2,356,872

UNITED STATES PATENT OFFICE 2,356,872

KNIFE

Antonio Monaco, Maspeth, Long Island, N. Y.

Application December 26, 1942, Serial No. 470,277

21 Claims. (Cl. 107—22)

This invention relates to knives. More particularly the invention pertains to knives for cutting continuously moving pastry strips.

One of the objects of the invention is to provide a knife of the character described which is adapted to cut a pastry strip into a plurality of cookies of uniform length as the strip continuously moves past a cutting station.

Another object of the invention is to provide a knife of the character described, the blades of which are kept clean by periodic immersion in a bath, but which nevertheless does not leave dark water rings or marks on the severed cookies.

A further object of the invention is to provide a knife of the character described in which the pastry strips are held against the moving supporting surface on which they lie during a cutting operation, whereby the severed cookies have clean cut and uncracked ends and edges and remain in perfect alignment.

An additional object of the invention is to provide a knife of the character described which comprises relatively few and simple parts, is economical to manufacture and employ, and is durable in operation and highly efficient for the purposes set forth.

Other objects of the invention will in part be obvious and in part hereinafter pointed out.

The invention accordingly consists in the features of construction, combinations of elements and arrangement of parts, which will be exemplified in the construction hereinafter described and of which the scope of application will be indicated in the appended claims.

In the accompanying drawings in which is shown one of the various possible embodiments of this invention, Fig. 1 is a side view of a cutting machine embodying my invention, illustrated in connection with a portion of a continuously moving conveyor belt on which pastry strips to be cut are carried;

Fig. 2 is a top plan view thereof partly broken away to illustrate various structural details of the machine;

Fig. 3 is a sectional view taken substantially along the line 3—3 of Fig. 1 and is illustrative of the drive for the ganged knives, the cleaning bath for the knives and the wiping mechanism for removing water from the knives after passage through the cleaning bath;

Figure 1:
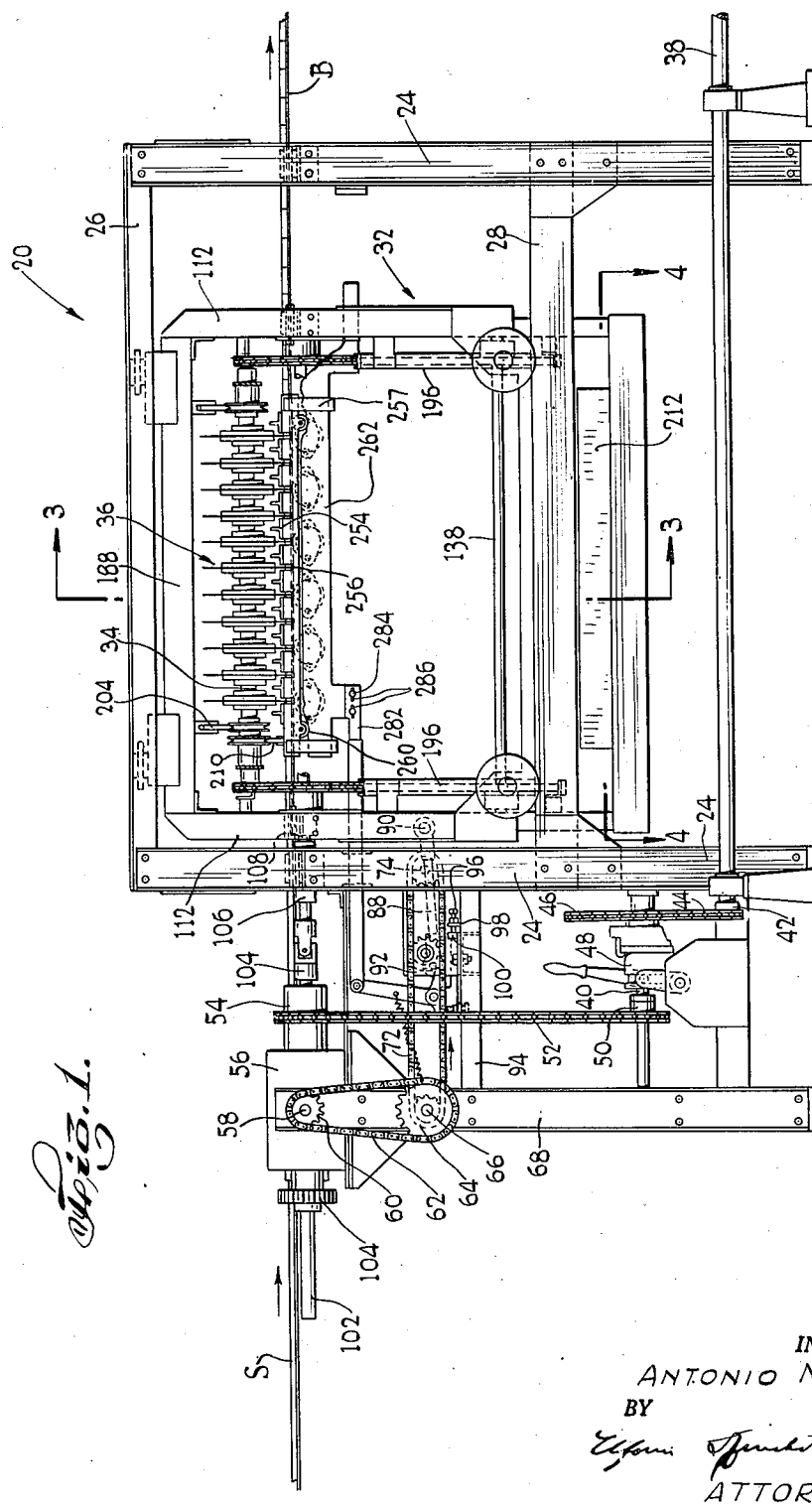

Fig. 4, which is a sectional view taken substantially along the line 4—4 of Fig. 1, shows in plan the cleaning bath for the ganged knives;

Fig. 5 is a sectional view taken substantially along the line 5—5 of Fig. 4;

Fig. 6 is an enlarged detail view in elevation of a portion of the cleaning bath;

Fig. 7 is an enlarged sectional view taken substantially along the line 7—7 of Fig. 2 and is illustrative of the construction of the ganged knives and drive shaft therefor;

Fig. 8 is a sectional view taken substantially along the line 8—8 of Fig. 7 and is illustrative of the mechanism employed to resiliently press the knives against the conveyor belt during cutting of the pastry strips;

Fig. 9 is a sectional view taken substantially along the line 9—9 of Fig. 7 and is illustrative of the mechanism employed to support and actuate the drive shaft for the ganged knives;

Fig. 10 is a detail view, partly in section, of the device for holding pastry strips against the conveyor belt during the severing thereof by the ganged knives;

Fig. 11 is an enlarged sectional view taken substantially along the line 11—11 of Fig. 2 and is illustrative of the mechanism for operating the holding device shown in Fig. 10;

Fig. 12 is a sectional view taken substantially along the line 12—12 of Fig. 3 and is illustrative of the device for wiping water off the ganged knives after the latter have passed through the cleaning bath; and Fig. 13 is a detail view of the mechanism for actuating the wiping device.

In general I carry out the objects of my invention by providing a plurality of circular knives which are ganged on a common drive shaft lying parallel to the travel of the pastry strip conveyor belt. This direction will hereinafter be referred to as "longitudinal" and that at right angles thereto, as "transverse." Said shaft is supported on a carriage which is reciprocated longitudinally and the shaft is reciprocated transversely by means moving with the carriage. By timing the forward motion of the carriage to match the travel of the belt while the knife blades traverse the belt, I prevent relative longitudinal movement of the knife blades and pastry strips. As a result the knife blades can traverse the conveyor belt and cut the pastry strips into separate cookies, while the belt is moving, without disturbing the strips.

Further pursuant to the invention the carriage is provided with a cleaning bath and with a wiping mechanism which lie in the path of travel of the ganged knives after they emerge from the cleaning bath and before they traverse the conveyor belt.

Referring now in detail to the drawings, I have there disclosed a cutting machine 20 for use in conjunction with a metal conveyor belt B on which there are disposed a plurality of endless pastry strips S, arranged in closely spaced, parallel relationship (Fig. 2). As is well known in the art the said conveyor belt B is endless and may form part of a continuous baking machine in which said belt successively passes beneath a station in which dough or the like is deposited and through an oven in which the dough is baked.

The cutting machine 20 includes a skeleton frame comprising four upright standards 24, arranged in pairs on opposite sides of the conveyor belt. These standards are joined by a plurality of upper and lower beams 26, 28 to rigidify the frame. The lower beams 28, disposed on opposite sides of and below the level of the conveyor belt B, are in the form of flat plates (Fig. 3), whose upper edges serve as rails for the flanged wheels 30 of a carriage 32. Said carriage 32 functions as a reciprocating support for a drive shaft 34 on which a plurality of parallel, aligned, ganged, circular knife blades 36 are mounted.

In accordance with the invention, suitable means are provided to cyclically move the carriage longitudinally forward at the same speed as that at which the belt B is driven and to then return the carriage in an opposite direction. Said means may be actuated by a drive shaft 38 which serves as the primary source of power for the continuous baking machine.

The carriage moving means includes a countershaft 40 (Fig. 1) which is turned by the drive shaft 38 through a sprocket 42, chain 44, sprocket 46 and manually controlled clutch 48. On the countershaft 40 there is mounted a sprocket 50, which, through a chain 52, drives sprocket 54 on the longitudinally extending power input shaft (not shown) of a gear box 56. This input shaft is connected through a pair of beveled gears (not shown) to a transversely extending power output shaft 58, carrying a sprocket 60. Said sprocket 60 engages a chain 62, passing around a sprocket 64 (Figs. 1 and 2) mounted on a shaft 66, which passes underneath the conveyor belt B and is journalled in two auxiliary standards 68 on opposite sides of the machine 20.

On the shaft 66, adjacent each of these standards, there is fixed a sprocket 70 carrying a chain 72, which drives a sprocket 74 on a short shaft 76 journalled in the standards 24 nearest to gear box 56. The shafts 76 carry sprockets 78. Each sprocket 78 engages a traversing chain 80 passing over an idler sprocket 82 of the same size as the sprocket 76, the spacing and radius of the sprockets 78, 82 being determinative of the throw of the carriage 32. Said chains 80 have conventional drive fittings which comprise pegs 84 carried by the links or pins of the chains. The pegs 84 on the two traversing chains face each other and are disposed in registration in order to rotatably support the opposite ends of a traversing shaft 86. Connecting rods 88, journalled on the shaft 86 at their crank ends, are pivoted at their gudgeon ends to a transverse shaft 90 rigidly fixed on the carriage 32.

It will thus be seen that a direct, positive, and non-slipping drive is provided between the clutch 48 and the carriage 32, which will linearly reciprocate said carriage in exactly identical cycles due to the fact that all the power transmitting mechanisms up to the connecting rods 88 are uniformly and positively driven in the same direction. The linear speed of the carriage 32 may be changed by varying the number of teeth in either of the sprockets 60, 64. The throw of the carriage 32 may be changed by varying the spacing between the centers of the sprockets 78, 82 and the number of links in the traversing chain 80.

In order to take up slack in the chain 80 the sprocket 82 is journalled on a channel iron 92, whose horizontal flange is held to a truss 94, interconnecting the standards 24, 68, by bolts passing through slots in the channel irons. A screw 96 threaded through a lug 98, projecting from the truss 94, presses against an ear 100 on the channel iron 92 and, when the bolts holding the channel iron to the truss 96 are loosened, is used to tighten the chain.

Pursuant to my invention, means is also provided for causing the ganged knife blades to traverse the conveyor belt B as the carriage 32 is reciprocated. Such means preferably employs as its source of power at least part of the driving train which is used to actuate the reciprocating mechanism for the carriage.

The blade-traversing means comprises a shaft 102 (Fig. 1), on which there is slidably keyed a non-shiftable pinion (not shown) driven by a gear 104, mounted on the power input shaft for the gear box 56. The shaft 102 is coupled by a pair of universal joints 104, 106 to a longitudinally extending shaft 108 (Figs. 1, 2, and 3) on the carriage 32. This latter shaft 108 is journalled in and extends between a pair of plates 110, supported on standards 112, forming one side of the carriage 32. On the opposite side of the carriage a similar parallel shaft 114 is journalled in and extends between plates 116 carried by the opposite carriage standards 118. For reasons which will later be apparent, the journal plates 116 are slidably mounted between a pair of ways 120 on the standards 118 and are biased toward said standards by take-up springs 122. Each of these springs encircles a rod 124, pivoted to a journal plate 116 and is maintained in compression between a nut 126 threaded on said rod and a carriage standard 118. The frame of the carriage is completed by upper cross beams 128 and lower cross beams 130. Rotatably supported on journal plates 132, carried on vertical beams 134 suitably mounted on the carriage 32, are two more shafts 136, 138 which lie parallel to the shafts 108, 114. These shafts 136 and 138 are disposed below the level of and under the conveyor belt B. Each of the four shafts 108, 114, 136 and 138 is equipped with two sprockets 140, one at the front of the cutting machine 20 and the other at the rear. The four front sprockets 140 are arranged in a common vertical plane parallel to the plane in which the four back sprockets are disposed, and each set of sprockets is provided with a traversing chain 142. Slack in the chain 142 is absorbed by the take-up springs 122. The chain 142 carries a drive fitting 144 (Figs. 7 and 9) for the knife blade shaft 34, which fitting comprises a journal section 146, having a tail piece 148 secured to the traversing chain 142 by a pair of bolts 150, which also serve to connect adjacent links of the chain. The inner ends of the journal sections 146 are recessed to form wells 150 in which bushings 152 are frictionally held. Said bushings 152 are arranged in alignment and rotatably receive opposite ends of the drive shaft 34. Near one end of said drive shaft, there is provided a V-flanged pulley 154 (Figs. 7 and 10), which is keyed to said shaft for rotation therewith. Two other V-pulleys 156 are also provided on opposite ends of the shaft, one being adjacent the fixed pulley 154. These latter pulleys 156 are rotatably mounted on bushings 158 fitted to the shaft 34.

The circular knife blades 36 each comprise a thin steel disc 160 (Figs. 7 and 8), whose periphery is sharpened to a keen cutting edge. Each disc is provided with a central aperture 162 of substantially circular outline, having three equidistantly spaced notches 164 cut therein. The blades are held between pairs of heavy flange plates 166, 168, which are fixed to the shaft 34 by a key 169 and are secured to each other by a plurality of bolts and nuts 170. One of the flange plates 166 has a annular ridge 172 surrounding the shaft 34 and the other of the plates 168 is correspondingly recessed as at 174 to receive said ridge and securely lock said plates against radial shifting. The flange plate 168 has a shallow recess 176 cut around its periphery to receive a steel cutting disc 160. Said recess is of such radial depth that the cutting disc is free to shift radially a slight amount (in the disclosed form about three-eighths of an inch) for a purpose which will later be apparent. To take up this play and resiliently bias the disc 160 to a normal position coaxial with the drive shaft 34, I provide a series of mating recesses in the flange plates 166, 168 which cooperate to form radial wells 178. The bases of said wells may be threaded to receive set screws 180 which aid the key 169 in fixing the discs 160 for rotation with the shaft 34. Seated against the heads of said set screws 180 are coil springs 182 which are maintained under compression between these screws and the bases of plungers 184 floating in the wells 178. The outer ends of the plungers are bifurcated to provide two arms between which the disc 160 is snugly received. Said plungers are so arranged that they are received in the notches 164 of the disc 160 and thus limit angular play of the discs. It will be seen that, by virtue of this construction, if the axes of the shaft 34 and discs 160 are disaligned, one or more of the springs 182 will oppose the disaligning force. This feature insures complete severance of individual cookies from the pastry strips since it enables the knives to be resiliently pressed against the conveyor belt B.

From the foregoing it will be seen that as the carriage is being reciprocated longitudinally, the knife blades are cyclically moved transversely across the top of the conveyor belt, then down and under the belt and finally up to retraverse the belt.

It will be noted that the knife-traversing and carriage-reciprocating drives both derive power from the gear box 56, so that if it is desired to regulate the speed of traverse of the knives relative to the rate of reciprocation of the carriage without disturbing the carriage drive, the gear 104 and meshing pinion (not shown) on the shaft 102 should be changed. The traversing and reciprocating speeds of the knives and carriage must be so set by regulating the drives thereof in the manner hereinbefore set forth that the knives will travel once around the sprockets 140 each time the carriage completes one reciprocating cycle and cross over the top of the belt while the carriage and belt are moving in the same direction and at the same speed. Furthermore the throw of the carriage should be so regulated that it is equal to the distance from the foremost to the last of the ganged knife blades 36 or to this distance plus the distance between two adjacent blades. With these adjustments made, each time the knives traverse the conveyor belt they will cover a region thereon immediately behind the region last traversed by the knives or a region spaced away from the last traversed region by a distance equal to the length of one cookie being cut.

If cookies of different lengths are to be cut, the spacing of the discs 160 on the shaft 34 is altered and blades added or subtracted so that the distance from the first to the last blade is equal to the throw of the carriage or to the throw of the carriage less one cookie.

The carriage 32 is provided with various auxiliary mechanisms to guide the reciprocation of the carriage, the travel of the rotary knives 36, and the travel of the conveyor belt B.

One such mechanism prevents lateral shifting of the carriage and comprises rollers 186 mounted on angle irons 188, secured on top of the carriage standards 112, 118. These rollers ride on the vertical faces of the beams 26 which form part of the stationary skeleton framework for the cutting mechanism 20.

The conveyor belt is supported during passage through the cutting mechanism by a plurality of transversely disposed heavy rollers 189 rotatably mounted between angle irons 190 (Figs. 3 and 10), bolted to cross pieces 191 on the carriage. These rollers 189 prevent deflection of the conveyor belt when it is pressed down by the knives 36 during a severing operation. Sheaves 192 (Fig. 2) mounted on angle plates carried by the angle irons 190, limit transverse shifting of the belt B in the immediate region of cutting, and similar sheaves 194 on the framework standards 24 limit transverse shifting of the belt at its point of entry to and departure from the cutting machine.

Angle irons 196, 198, 200, 202 (Figs. 3 and 10) are arranged around the path of travel of the knife traversing chain 142 in such manner as to dispose flanges beneath the chain which carry the weight of the knives, drive shaft 34 and chain 142. The uppermost of these angle irons 202 is of particular use in controlling the path of travel of the knife drive shaft 34, and thereby the pressure of the knives against the conveyor belt, during cutting of the pastry strips. To make certain that the drive shaft rides on this angle iron, a pair of presser rails 204 (Figs. 1, 3, and 10) are provided, one at the front and one at the rear of the carriage where they are suspended by rods 206. Springs 208 bias the rails 204 to their lowermost position. The bottom edge of the rails are beveled to engage the V-shaped floating pulleys 156 at both ends of the drive shaft 34 and are arranged to ride in said pulleys during the time that the knives are crossing over the conveyor belt. These rails are so positioned that they will be lifted by the floating pulleys 156 when the drive shaft passes therebeneath, thereby passing the shaft against the upper angle iron guide rails 202 and also resiliently pressing the steel discs 160 against the conveyor belt.

It will be appreciated that since the drive shaft 34 merely lies loosely in the two bearings 146, that said shaft and the knives carried thereon have a tendency to shift axially. To prevent this, reinforce the knife shaft, and provide a safety guard which will knock objects out of the path of the ganged knives, I mount a yoke 206 (Fig. 4) on each of the journals 146. Said yoke straddles the tail piece 148 and rests against the base of the journal section 146. The yoke arms are aligned and connected by spacing bars 208 which define a plane passing through the axis of the drive shaft 34. The spacing bars are slightly shorter than the distance between the ends of the yoke arms so that when they are bolted in place, the yokes will be drawn together and force both journals 146 against the ends of the knife shaft.

Means may also be provided to impart an initial angular momentum to the drive shaft 34 immediately prior to bringing the ganged knives over the conveyor belt so that the knives will be not at a standstill when they first start to sever the pastry strips. This prevents the knives from initially being dragged across the belt and cracking the edges of the pastry strip first encountered. Such means may comprise a spinner rail 210 which is adapted to cooperate with the drive shaft 34 immediately prior to the time that the knife blades encounter the top of the conveyor belt. Said spinner rail is disposed below the path of travel of the drive shaft and has a beveled edge which is adapted to engage the fixed pulley 145. The end of the spinner rail which first contacts the fixed pulley is so disposed that the drive shaft is turned before the cutting blades touch the side of the conveyor belt. The opposite end of the spinner rail is located at a point over the conveyor belt between the edge thereof and the first pastry strip.

According to another feature of the invention I provide means for cleaning the rotary cutting knives 36 after each cutting traverse of the conveyor belt. Such means may function on the lower horizontal return pass and is preferably mounted on the carriage 32 so as to be reciprocated therewith. Said cleaning means comprises a washpan 212 (Figs. 4, 5, and 6) supported by the beams 130. A series of angle irons 214 run across the washpan in the direction of travel of the cutting knives. The vertical legs of these irons terminate adjacent the bottom of the washpan to prevent water contained therein from being too greatly agitated when the knives are cleaned. Said angle irons are secured by posts 216 and bolts 218 to the washpan in such manner that the horizontal flanges of the irons are disposed just beneath the top surface of the water. Each of these horizontal flanges carries a felt strip 220 which thus has its underface disposed right on the top surface of the wash water. The felts are secured by clamp plates 222, held by rivets 224 to said flanges. Adjacent felts have their edges juxtaposed. The felts 220 and supporting angle irons 214 are so spaced that the opposite edges of the felts are spaced apart a distance equal to the spacing between adjacent cutting discs 160 and lie exactly in the path of travel of said discs during the lower horizontal pass of the knife shaft 34. The cutting blades 36 during such pass will enter between the felt edges and be immersed in the water of the bath where accumulated cake and jam (if the pastry strips happen to have jam centers) will be removed by washing and rubbed off by the felts. The frictional drag of the felts also cause the discs 160 to rotate so that the entire circumference thereof is cleaned.

If the knives, after they leave the wash bath, are applied to the pastry strips to sever cookies therefrom, it will be found that some of the water remaining upon the knives is absorbed in the ends of the severed cookies causing the formation of dark rings therearound which materially detract from the appearance and sales value of the cookies.

Therefore, in accordance with still another feature of my invention I provide means for removing the water left upon the cutting discs after washing. Such means preferably is carried by the carriage 32 and may comprise a wiper mechanism including a rubber squeegee blade 226 (Figs. 3, 12, and 13). Said blade is clamped between two metal plates 228, 230, one of which 230 is secured at its opposite ends to trucks 232, whose wheels 234 ride in U shaped rails 236. These rails extend outwardly and upwardly from the washpan 212 and are supported in any suitable manner on the carriage 32. The major portion of the rails runs parallel to the outwardly inclined chain supporting angle iron 200 and this portion is of such length (later described) as to effect a complete wiping of the knife blades. Above this parallel portion the rails are sloped away, as at 238, from the angle iron 200. The trucks 232 are each provided with an extension 240 which is adapted to be engaged by a portion of the yoke 206. In this manner when the ganged knives reach the wiping station the yoke 206 will engage the extension 240 and force the trucks and squeegee blade upwardly. The extension 240 is so proportioned and disposed that the squeegee blade will begin to move up after the cutting discs have entered slits 242 in said blade to such a depth that the tip of the blade lies adjacent to the periphery of the flange plates 166, 168. While the blade is being raised with the ganged knives, said knives are rotated in a clockwise direction (as viewed from Fig. 13) by a spinner rail 244 which is adapted to engage the fixed pulley 154. Said spinner rail is resiliently pressed against the fixed pulley by springs 248. Thus the shaft 34 will turn as the squeegee blade and cutting discs move upwardly in unison. The length of the parallel portion of the rails 236 is such that during the movement of the shaft 34 past the same the spinner rail will turn said shaft at least one revolution. To keep the shaft parallel to the squeegee blade as the knives are wiped, a presser rail 250 similar to the spinner rail 244, is arranged to engage the floating pulley 156 on the opposite end of the shaft from that on which the fixed pulley 154 is mounted. The extension 240 is made short enough so that after the truck has reached the end of the parallel portion of the rails 236 and is riding on the sloped portion 238, the yoke will clear the extension and permit the trucks and wiper to return by gravity to starting position which is defined by stop bumpers 252, lying in the rails 236 and adapted to be contacted by the lower of the wheels 234. A drain pan 253 returns the wiped off water to the cleaning bath.

Means is also provided for lightly holding the pastry strips and cookies against the surface of the conveyor belt during severing of the strips, so that the formed cookies, which have a tendency to rise with the rotating cutter blades, will lie stationary upon the conveyor belt. Such means comprises a plurality of T-irons 254 (Figs. 1, 2, 3, 7, and 10) disposed above the conveyor belt B immediately over the pastry strips S, and below the path of the drive shaft 34. Said T-irons are disposed in parallel spaced relationship and are so arranged that the slots formed between their juxtaposed edges lie in the path of travel of the cutting discs 160. These irons reciprocate with the carriage 32 and are thus always in position to receive the traveling knives 36 therebetween.

The irons 254 are supported at their opposite ends on plates 256 which are mounted for vertical reciprocation relative to the carriage 32 by means of straps 257, vertically slidably received in channels 258 in the plates and fixed to the angle irons 190. Said plates also carry rollers 260 which ride on cam bars 262, longitudinally slidingly supported on the carriage 32 by the straps 257. The actuating surfaces of the cam bars contain sets of depressions 264 and 266, one of which 264 is of such depth that when the roller 260 lies therein the lower flange of the T-iron will be just above or very lightly rest on the pastry strips or cookies (full line position in Fig. 7). The other depressions 266 are of such depth that when the rollers 260 lie therein the T-irons will be disposed in a position spaced well above the pastry strips (dotted line position in Fig. 10).

To permit the irons to lightly press against the pastry strip during the forward movement of the carriage and to keep the irons raised above the pastry strip during retraction of the carriage, means is provided to shift the cam bar 262 longitudinally at the two opposite extremes of the carriage movement. The means for shifting the cam bar from right to left relative to the plate 256 (as viewed from Fig. 10) at the end of a forward carriage movement comprises an arm 268, integrally extending from the cam bar 262. Said arm is of such length and is so disposed that when the carriage is approaching the end of its forward travel the arm will butt against a stop 270 affixed to the stationary framework of the machine and thus raise the T-irons. This arm may contact the framework before the forward motion of the machine is completed, since at such time the knives have finished making their cut and will be traveling down to the washpan.

Similar means may not, however, be employed to lower the T-irons since, if said irons are lowered during retraction of the carriage, they will scrape against the advancing surface of the pastry strips. To secure proper operation of the strip holding means it is imperative that the T-irons only be allowed to descend to their lowermost position when the carriage is moving forwardly. A mechanism which will satisfactorily accomplish this action comprises a bellcrank lever 272 (Fig. 11) normally biased by a spring 274 to the dotted line position shown in Fig. 11. Said bellcrank lever is pivoted on a journal box secured to the channel iron 92. The lower stub arm 276 of the bellcrank lever when in its normal (dotted line) position lies in that portion of the path of travel of the traversing shaft 86, which corresponds to the beginning of the forward movement of the carriage. When the traversing shaft strikes the bellcrank lever it will rotate the same to the full line position shown in Fig. 11 thereby rapidly shifting a link 278 pivoted to the longer arm 280 against an abutment member 282 (Fig. 1) suspended from the cam bar 262. The movement of the link 278 is much more rapid than the forward motion of the carriage and will therefore force the cam bar to the right permitting the T-irons to drop. Said abutment member is adjustably mounted on the cam bar by clamping nuts and bolts 284 which pass through slots 286 in said member.

As soon as the link 278 has shifted the cam bar and the bellcrank arm 276 is cleared by the traversing shaft 86, said lever will be restored to normal position by the spring 274, to await the next cycle of operation of the machine.

It will thus be seen that I have provided a device which achieves the several objects of the present invention and it is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A machine for cutting pastry strips and the like continuously moved by a conveyor to, through and beyond said machine, said machine comprising in combination, a knife, means to reciprocate said knife longitudinally of said conveyor, and separate means to move said knife around an endless closed path, through one portion of which said knife traverses said conveyor in position to cut the strips thereon and through another portion of which said knife retraverses said conveyor and is spaced from said strips so as not to contact the same.

2. A machine for cutting pastry strips and the like continuously moved by a conveyor to, through and beyond said machine, said machine comprising in combination, a carriage, means to reciprocate said carriage longitudinally of said conveyor, a knife longitudinally reciprocable with said carriage, and means to move said knife around an endless closed path, through one portion of which said knife traverses said conveyor in position to cut the strips thereon and through another portion of which said knife retraverses said conveyor and is spaced from said strips so as not to contact the same.

3. A machine for cutting pastry strips and the like continuously moved by a conveyor to, through and beyond said machine, said machine comprising in combination, a series of knives ganged on a longitudinally extending shaft, means to move said shaft longitudinally of said conveyor, and means to move said shaft around an endless closed path through one portion of which the shaft traverses said conveyor in such position that the knives thereon cut the strips and through another portion of which said shaft retraverses said conveyor in such position that the knives are spaced from said strips so as not to contact the same.

4. A machine for cutting pastry strips and the like continuously moved by a conveyor to, through and beyond said machine, said machine comprising in combination, a carriage, means to reciprocate said carriage longitudinally of said conveyor, a series of knives ganged on a longitudinally extending shaft longitudinally reciprocable with said carriage, and means to move said shaft around an endless closed path through one portion of which the shaft traverses the conveyor in such position that the knives thereon cut the strips and through another portion of which said shaft retraverses said conveyor in such position that the knives are spaced from said strips so as not to contact the same.

5. A machine as set forth in claim 4 wherein the distance the carriage longitudinally reciprocates is an even multiple of the space between adjacent knives.

6. A machine as set forth in claim 4 wherein the distance the carriage longitudinally reciprocates is equal to the distance from the foremost to the last of the knives plus the distance between two adjacent knives.

7. A machine as set forth in claim 4 wherein the distance the carriage longitudinally reciprocates is equal to the distance from the foremost to the last of the knives.

8. A machine as set forth in claim 4 wherein the shaft traverses and retraverses the conveyor once each time the carriage is longitudinally reciprocated and wherein the knives traverse the conveyor for cutting only once while the carriage longitudinally reciprocates once.

9. A machine as set forth in claim 4 wherein the knife blades are radially shiftable relative to the shaft and wherein means is provided for resiliently biasing said blades to a position coaxial with said shaft.

10. A machine as set forth in claim 4 wherein the knife blades are radially shiftable relative to the shaft, and wherein means is provided for resiliently biasing said blades to a position coaxial with said shaft and other means is provided for resiliently urging said shaft towards the conveyor during a cutting operation thereof.

11. A machine as set forth in claim 4 wherein a wash bath is provided which is longitudinally reciprocable with said carriage.

12. A machine as set forth in claim 4 wherein a wash bath is provided which is longitudinally reciprocable with said carriage and wherein means is provided to wipe water away from said knives after they have left the wash bath.

13. A machine as set forth in claim 4 wherein a wash bath is provided which is longitudinally reciprocable with said carriage and wherein means is provided to wipe water away from said knives after they have left the wash bath, said last named means being longitudinally reciprocable with said carriage.

14. A machine as set forth in claim 4 wherein the knives are circular, wherein a wash bath is provided which is longitudinally reciprocable with said carriage, and wherein means is provided to wipe water from the knives after they have left the wash bath, said last named means being longitudinally reciprocable with the carriage and including a wiper blade adapted to rub against and move with the knives after they have left the wash bath, and means to rotate the knives.

15. A machine as set forth in claim 4 wherein means movable with said carriage is provided for lightly holding the strips against the conveyor while they are being cut by the knives.

16. A machine as set forth in claim 4 wherein means longitudinally reciprocable with said carriage is provided for lightly holding the strips against the conveyor while they are being cut by the knives, said last named means being disposed in operative position only during forward longitudinal movement of said carriage.

17. A machine as set forth in claim 4 wherein means longitudinally reciprocable with said carriage is provided for lightly holding the strips against the conveyor while they are being cut by the knives, said last named means being effective during the initial forward movement of said carriage and being rendered ineffective during the end of the forward movement of said carriage.

18. A machine as set forth in claim 4 wherein the knife blades are circular and are rotated during cutting by contact between the blades and conveyor and wherein means is provided to rotate the shaft immediately prior to a cutting operation of said blades to provide an initial angular momentum to the shaft and blades and prevent the blades from dragging across the conveyor at a standstill when they first encounter the conveyor.

19. A machine as set forth in claim 4 wherein the means for causing the shaft to traverse and retraverse the conveyor comprises a pair of spaced parallel chains encircling the conveyor and having aligned fittings thereon in which the ends of the shaft are rotatably received.

20. A machine as set forth in claim 4 wherein the means for causing the shaft to traverse and retraverse the conveyor comprises a pair of spaced parallel chains encircling the conveyor and supporting opposite ends of the shaft thereon.

21. A machine as set forth in claim 4 wherein the means for causing the shaft to traverse and retraverse the conveyor comprises a pair of spaced parallel chains encircling the conveyor and rotatably supporting opposite ends of the shaft thereon.

ANTONIO MONACO.